United States Patent [19]

Rocholl et al.

[11] Patent Number: 4,865,166
[45] Date of Patent: Sep. 12, 1989

[54] ASSEMBLY AND DISASSEMBLY SYSTEM WITH A SPRING RETAINING MEMBER FOR A BRAKE ACTUATION UNIT

[75] Inventors: Hans Rocholl, Remscheid; Horst Klein, Erlenstr, both of Fed. Rep. of Germany

[73] Assignee: Bergische Stahl-Industrie, Fed. Rep. of Germany

[21] Appl. No.: 64,254

[22] Filed: Jun. 19, 1987

[30] Foreign Application Priority Data

Jun. 27, 1986 [DE] Fed. Rep. of Germany ....... 3621637

[51] Int. Cl.$^4$ .......................... F16D 65/56; F01B 9/04
[52] U.S. Cl. .................................. 188/196 D; 92/29; 188/203
[58] Field of Search ..................... 188/71.7, 71.8, 72.4, 188/72.3, 72.6, 202, 203, 196 D, 214, 106 F, 265, 73.32; 192/111 A, 85 AA, 112; 92/29, 31, 33, 130 A; 267/182, 174, 176

[56] References Cited

U.S. PATENT DOCUMENTS

| | | | |
|---|---|---|---|
| 2,602,662 | 7/1952 | Kintzinger | 267/176 |
| 3,687,243 | 8/1972 | Totschnig | 188/196 D |
| 3,744,596 | 7/1973 | Sander | 188/203 |
| 4,088,205 | 5/1978 | Frania et al. | 188/203 X |
| 4,113,070 | 9/1978 | Paginton | 188/203 X |

Primary Examiner—Robert J. Oberleitner
Attorney, Agent, or Firm—McGlew & Tuttle

[57] ABSTRACT

An assembly and disassembly system for a spring of a brake actuation unit, in particular for rail vehicles including a fluid pressure cylinder and a piston slidable in the cylinder. A cylindrical nut member is provided having a tubular portion extending outwardly of the piston. An output head is connected to the tubular portion and includes an outer tubular portion extending towards the piston. A compression spring is provided disposed between the tubular portion of the cylindrical nut member and the outer tubular portion of the output head. A sleeve member is disposed between the spring and the outer tubular portion of the output head. This sleeve is provided with a slot which extends in an axial direction along the sleeve. The outer tubular portion includes an opening which may be aligned with the sleeve slot. A member such as a pin is provided which extends through the opening into the slot holding the sleeve and the outer tubular portion in a position engaged around the spring.

3 Claims, 1 Drawing Sheet

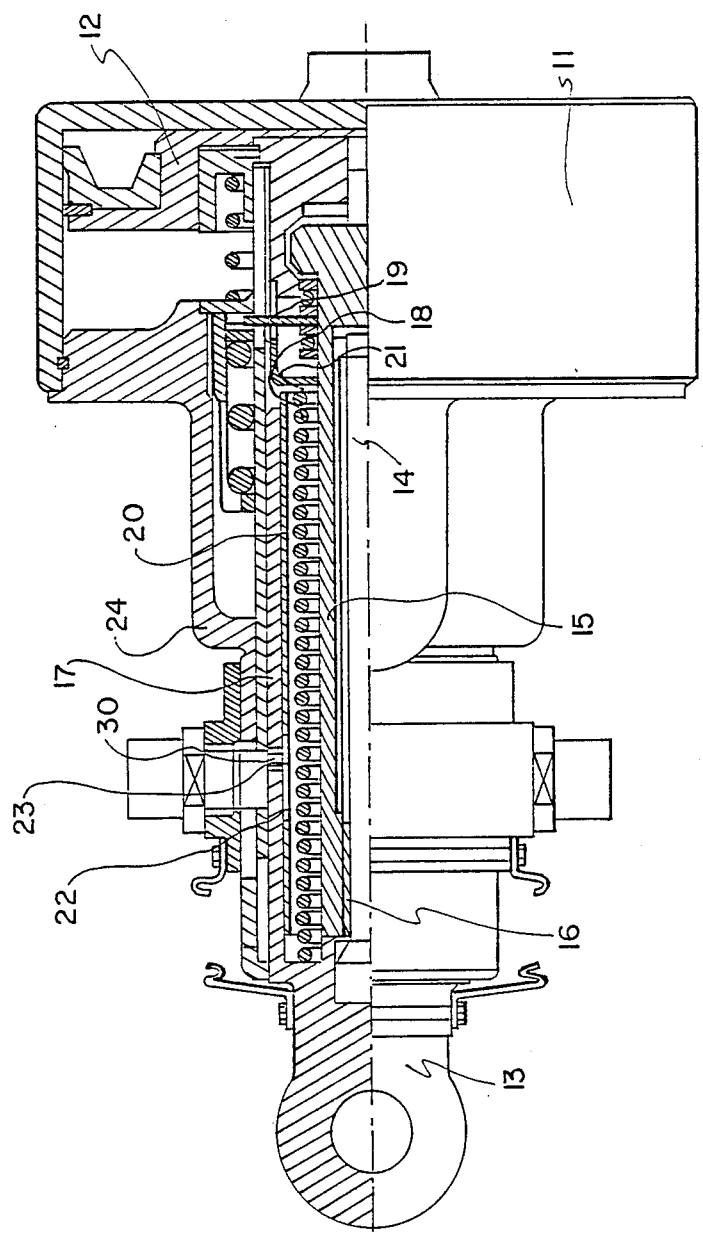

ASSEMBLY AND DISASSEMBLY SYSTEM WITH A SPRING RETAINING MEMBER FOR A BRAKE ACTUATION UNIT

FIELD AND BACKGROUND OF THE INVENTION

The invention relates to an assembly and disassembly system for the actuating spring of a brake actuation unit, in particular for rail vehicles, where the spring applies against the output head and against the piston of the hydraulic or pneumatic cylinder directly or via intermediate members, and is tensioned to the brake force, the spring lying radially between two tubes.

The spring disposed in the brake actuating device is tensioned to a relatively high force when the system is being assembled. Also during disassembly the spring is still tensioned relatively strongly, so that it has heretofore always been necessary to use auxiliary means to prevent the spring from being expanded in an uncontrolled manner, possibly injuring the assembly worker.

SUMMARY OF THE INVENTION

The invention provides an arrangement for the spring to remain in the tensioned state when the actuating system must be disassembled. In accordance with the invention between the outer tube and the actuating spring a sleeve is disposed, the length of which approximately corresponds to the spring length, which sleeve applies by an inwardly pointing flange in axial direction against the end of the spring turned toward the piston, and which is axially fixable by means of a radial screw, pin or the like that can be screwed into an opening in the outer tube and that extends into the slot.

Advantageously the opening in the sleeve for the screw, pin or the like comprises an axis-parallel slot, the length of which corresponds to the extension of the spring upon complete adjustment of the system. If the sleeve with the radial pin or screw is fixed in the tube, the spring can no longer expand in an uncontrolled manner upon dissassembly, whereby injuries are reliably avoided. Also, assembly of the device is greatly facilitated by the invention. Accordingly it is an object of the invention to provide a brake actuating unit which includes an actuating spring which lies between a fluid pressure operated piston and an output head which is connectable to the brake. The arrangement includes an inner tube positioned between an outer tubular part of the brake head having a slot end which engages around an end of the spring, the other end of the spring being engaged at the inner end of the tubular output head. Means such as a pin extending from an opening in the outer tube into the slot holds the two parts in an assembled positioned with the spring on the compressive force.

A further object of the invention is to provide an assembly an disassembly system for a spring actuating brake unit which is simple in design, good in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE of the drawing is a axial sectional view and elevational view of a brake actuation unit constructed in accordance with the invention.

DESCRIPTION OF THE PREFERRED EMBODIMENT

Referring to the drawing in particular the invention embodied therein including brake actuation unit which comprises a fluid pressure cylinder 11 having a piston 12 movable therein which includes a cylindrical nut member 16 having a tubular portion forming an inner tube or cylindrical nut 15 which extends outwardly of the piston toward an output head 13 which includes an outer tubular portion 17. In accordance with the invention a compression spring 18 is held in compression between sleeve 20, which has an end engaged around an end of the spring 18 and the outer tube 17 of the output head 13. In accordance with a feature with the invention the tubes are held in position in the assembled state by the imposition of a screw, pin, bolt or similar retaining member 30 into an opening 23 of the outer tube 17 and into a slot 22 of the sleeve 20 when the spring is in a compressed condition.

The drawing shows an embodiment example of the device according to the invention, where on the one side an actuating cylinder 11 with a piston 12 is arranged, and on the other side the output head 13 is connected e.g. with a brake lining (not shown). Between a head 13 and the cylinder 11 a spindle 14 is disposed, on which lies an inner tube 15 with the nut 16. The head 13 carries an outer tube 17, which extends almost to the piston 12 of the cylinder 11. Between the two tubes 15 and 17 lies the actuating spring 18, which is compressed and braces itself on the one end against the output head 13 and on the other end via an intermediate piece 19 against the piston 12. In the drawing, the spring is shown in the initial state. Due to the wear adjustment, the spring 18 becomes longer and longer in the course of time, namely until the brake linings are completely worn out. Against the inner wall of the outer tube 17 a sleeve 20 applies with sliding fit. An end of sleeve 20 is turned toward the cylinder 11 and carries an inwardly stepped flange 21. The flange 21 extends almost to the inner tube 15 and then lies between the spring 18 and the intermediate piece 19. At the front end the sleeve 20 comes almost up to the head 13. Near the end of sleeve 20 a slot 22 is arranged which matches an opening 23 in the outer tube 17. The opening 23 may have an internal thread. In the new state, that is, when the brake actuation unit has not yet carried out an adjustment (this being shown in the drawing), the opening 23 is the outer tube 17 lies approximately at the end of slot 22 turned toward the cylinder 11. In the course of the adjustments, the opening 23 through relative movement migrates farther and farther toward the other end of the slot 22.

To install the spring 18, it is compressed with the flange 21 of the sleeve 20 and inserted in the outer tube 17, until the slot 22 of sleeve 20 comes to lie in front of the opening 23 in the outer tube 17. Now either a pin 30 can be inserted into the opening 23 and slot 22 or a screw screwed into the opening 23 until it has penetrated into slot 22. Now, under the influence of the force of spring 18, the sleeve 20 can be pushed without difficulty into the housing 24 and be connected there with piston 12.

When the wear adjustment has arrived at its end point, the actuating spring has lengthened somewhat, because the head 13 with the outer tube 17 had been moved away from the cylinder 11 by the adjustment amount. But because the sleeve 20 is pushed by the spring 18 with the flange 21 against the intermediate piece 19, and therefore remains stationary in relation to the outer tube 17, the opening 23 moves to the opposite end of slot 22. For disassembly it is now possible to introduce a screw through the opening 23 or a pin into the slot 22, whereby the actuating spring 18 can no longer push the sleeve 20 out at flange 21 when the device is being taken apart, because the slot 22 fixes the sleeve 20 at its end to the screw or pin. Hence the actuating spring 18 remains tensioned although it no longer applies against the intermediate piece 19.

In special cases, several openings may be provided spaced from each other along the outer tube 17.

With the invention, the sleeve 20 can take on a variety of forms. It may, for example, comprise individual longitudinal strips, which are held together as a unit by one or more rings, the slot 22 being arranged in one strip. Alternatively it may consist of only two wider longitudinal strips which are diametrically opposite each other and are held together such as a unit by a ring.

Nor is it absolutely necessary to provide the flange 21 as a completely circling part, but it suffices, for a closed sleeve 20, to provide individual steps on which the spring 18 can take support.

What is claimed is:

1. An assembly and disassembly system for a brake actuation unit, in particular for rail vehicles, comprising: a fluid pressure cylinder; a piston slidable in said cylinder; a cylindrical nut member having a tubular portion extending outwardly of said piston and surrounding a spindle means; an output head including an outer tubular portion extending towards said piston; a compression spring disposed between said tubular portion of said cylindrical nut member and said outer tubular portion of said output head; a sleeve member disposed between said spring and said outer tubular portion of said output head and including a slot extending in an axial direction along said sleeve, said outer tubular portion having an opening extending therethrough; and, retaining member means extending through said opening of said tubular portion and extending into said slot for holding said sleeve and said outer tubular portion in a position engaged around the spring, said sleeve member having an end which extends around said spring.

2. An assembly and disassembly system according to claim 1, wherein: said retaining member means is a pin.

3. An assembly and disassembly system for a brake actuation unit, in particular for rail vehicles, comprising: a fluid pressure cylinder; a piston slidable in said cylinder; a cylindrical nut member having a tubular portion extending outwardly of said piston and surrounding a spindle means; an output head including an outer tubular portion extending towards said piston; a compression spring disposed between said tubular portion of said cylindrical nut member and said outer tubular portion of said output head; a sleeve member disposed between said spring and said outer tubular portion of said output head and including a slot extending in an axial direction along said sleeve, said outer tubular portion having an opening extending therethrough; and, retaining member means extending through said opening of said tubular portion and extending into said slot for holding said sleeve and said outer tubular portion in a position engaged around the spring, said sleeve member having an end which extends around said spring, the length of said slot corresponding to the extension of said compression spring.

* * * * *